(12) United States Patent
Yokono

(10) Patent No.: US 10,755,168 B2
(45) Date of Patent: Aug. 25, 2020

(54) INFORMATION PROCESSING DEVICE AND INFORMATION PROCESSING METHOD

(71) Applicant: SONY CORPORATION, Tokyo (JP)

(72) Inventor: Jun Yokono, Tokyo (JP)

(73) Assignee: SONY CORPORATION, Tokyo (JP)

( * ) Notice: Subject to any disclaimer, the term of this patent is extended or adjusted under 35 U.S.C. 154(b) by 22 days.

(21) Appl. No.: 15/772,679

(22) PCT Filed: Sep. 21, 2016

(86) PCT No.: PCT/JP2016/077913
§ 371 (c)(1),
(2) Date: May 1, 2018

(87) PCT Pub. No.: WO2017/086022
PCT Pub. Date: May 26, 2017

(65) Prior Publication Data
US 2019/0156186 A1 May 23, 2019

(30) Foreign Application Priority Data
Nov. 17, 2015 (JP) ................................ 2015-224445

(51) Int. Cl.
*G06N 3/063* (2006.01)
*G06T 7/00* (2017.01)
(Continued)

(52) U.S. Cl.
CPC ......... *G06N 3/063* (2013.01); *G06K 9/00087* (2013.01); *G06K 9/00791* (2013.01);
(Continued)

(58) Field of Classification Search
CPC ............ G06N 3/063; G06N 3/04; G06N 3/08; G06N 20/00; G06K 9/627; G06K 9/4628;
(Continued)

(56) References Cited

U.S. PATENT DOCUMENTS 5,060,278 A * 10/1991 Fukumizu ............ G06N 3/0454
382/157
5,497,430 A * 3/1996 Sadovnik ........... G06K 9/00221
382/118
(Continued)

FOREIGN PATENT DOCUMENTS

JP 08-086490 A 4/1996
JP 08-293025 A 11/1996
(Continued)

OTHER PUBLICATIONS

International Search Report and Written Opinion of PCT Application No. PCT/JP2016/077913, dated Nov. 15, 2016, 07 pages of ISRWO.

*Primary Examiner* — Xuemei G Chen
(74) *Attorney, Agent, or Firm* — Chip Law Group

(57) ABSTRACT

An information processing device includes a storage unit that stores learning information acquired by machine learning, an input unit that acquires identification information, and a processing unit that performs recognition processing using the learning information that is specified by the storage unit on a basis of the identification information. An information processing method is executed by a processor, the information processing method includes storing learning information acquired by machine learning, acquiring identification information, and performing recognition processing using the learning information that is specified from storage on a basis of the identification information.

17 Claims, 13 Drawing Sheets

(51) Int. Cl.
*G06K 9/62* (2006.01)
*G06K 9/00* (2006.01)
*G06N 3/04* (2006.01)
*G06N 3/08* (2006.01)
*G06K 9/46* (2006.01)
*G06N 20/00* (2019.01)

(52) U.S. Cl.
CPC ....... *G06K 9/00832* (2013.01); *G06K 9/4628* (2013.01); *G06K 9/627* (2013.01); *G06N 3/04* (2013.01); *G06N 3/08* (2013.01); *G06N 20/00* (2019.01); *G06T 7/00* (2013.01)

(58) Field of Classification Search
CPC ........... G06K 9/00832; G06K 9/00791; G06K 9/00087; G06T 7/00
See application file for complete search history.

(56) References Cited

U.S. PATENT DOCUMENTS

| | | | | |
|---|---|---|---|---|
| 6,697,711 | B2* | 2/2004 | Yokono | G06N 3/008 318/568.1 |
| 7,783,585 | B2* | 8/2010 | Sabe | G06N 3/0454 706/16 |
| 8,335,683 | B2* | 12/2012 | Acero | G06F 17/2715 704/246 |
| 8,484,025 | B1* | 7/2013 | Moreno Mengibar | G10L 15/063 704/255 |
| 10,402,749 | B2* | 9/2019 | Aminzadeh | G06N 20/00 |
| 2006/0140455 | A1* | 6/2006 | Costache | G06K 9/00221 382/118 |
| 2008/0273766 | A1* | 11/2008 | Kim | G06K 9/00295 382/118 |
| 2012/0054634 | A1* | 3/2012 | Stone | G06F 16/9577 715/745 |
| 2015/0131872 | A1* | 5/2015 | Ganong | G06K 9/00677 382/118 |
| 2015/0304727 | A1* | 10/2015 | Vandichalrajan | H04N 21/2343 725/40 |
| 2016/0050341 | A1* | 2/2016 | Erdler | H04N 1/444 380/245 |

FOREIGN PATENT DOCUMENTS

| | | |
|---|---|---|
| JP | 08/293025 A | 11/1996 |
| JP | 2012-243180 A | 12/2012 |

* cited by examiner

IMAGE DATA

LEARNING INFORMATION

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/077913 filed on Sep. 21, 2016, which claims priority benefit of Japanese Patent Application No. JP 2015-224445 filed in the Japan Patent Office on Nov. 17, 2015. Each of the above-referenced applications is hereby incorporated herein by reference in its entirety.

TECHNICAL FIELD

The present disclosure relates to an information processing device, an information processing method, and a program.

BACKGROUND ART

Recognition technology has developed in recent years and is widely used. Particularly, various technologies and products using the recognition technology have been developed. For example, a device for detecting the presence or absence of a specific object using object recognition technology has been developed.

However, the expansion in the application scope of the recognition technology has led to various needs for the recognition technology. Examples of the needs include the precision improvement and the acceleration of recognition processing. Such recognition processing is typically performed using a classifier which extracts a feature value and uses the feature value as an input. Therefore, the result of recognition processing depends on the precision and the accuracy of the processing using the classifier. Therefore, the generation of the classifier is important.

However, with complication of the recognition target, the generation of a classifier becomes more difficult. For example, for the generation of a classifier, machine learning based on learning data is often used. However, a vast amount of learning data may be required to improve the precision and the accuracy of the classifier. Therefore, the time for generating such a classifier can lengthen.

Meanwhile, the generation of a classifier by using transfer learning has been proposed. For example, Patent Literature 1 discloses a technology relating to a learning device that generates an object classifier by using so-called boosting-based transfer learning. Particularly, the learning device acquires an existing classifier as a transfer classifier. Next, the learning device selects a weak classifier having the minimum error rate relating to the feature value that is extracted from learning images among the weak classifiers that constitute the transfer classifier. Then, the learning device generates an object classifier by linearly coupling selected weak classifiers. According to the technology, it is said that the time for generating such an object classifier shortens.

CITATION LIST

Patent Literature

Patent Literature 1: JP 2012-243180A

DISCLOSURE OF INVENTION

Technical Problem

However, it has been difficult for the past technologies including the technology disclosed in Patent Literature 1 to increase the number of users. For example, the classifier used in recognition processing is often installed in a device in advance. On the other hand, the recognition processing desired typically varies depending on conditions, and, particularly, users. Therefore, in a case where a classifier used in desired recognition processing is not installed in a device, it is difficult to perform such desired recognition processing. In this regard, a method to install various types of classifiers in advance has been considered. However, such a case would cause the production cost of a device to increase and the price of the device to rise. As a result, users would hesitate to use such a device related to recognition processing.

Therefore, the present disclosure proposes a system that is capable of increasing the number of users using recognition processing.

Solution to Problem

According to the present disclosure, there is provided an information processing device including: a storage unit that stores learning information acquired by machine learning; an input unit that acquires identification information; and a processing unit that performs recognition processing using the learning information that is specified by the storage unit on a basis of the identification information.

In addition, according to the present disclosure, there is provided an information processing method to be executed by a processor, the information processing method including: storing learning information acquired by machine learning; acquiring identification information; and performing recognition processing using the learning information that is specified from storage on a basis of the identification information.

In addition, according to the present disclosure, there is provided a program causing a computer to achieve: a storing function for storing learning information acquired by machine learning; an input function for acquiring identification information; and a processing function for performing recognition processing using the learning information that is specified from storage on a basis of the identification information.

Advantageous Effects of Invention

As described above, according to the present disclosure, there is provided a system that is capable of increasing the number of users who use recognition processing. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
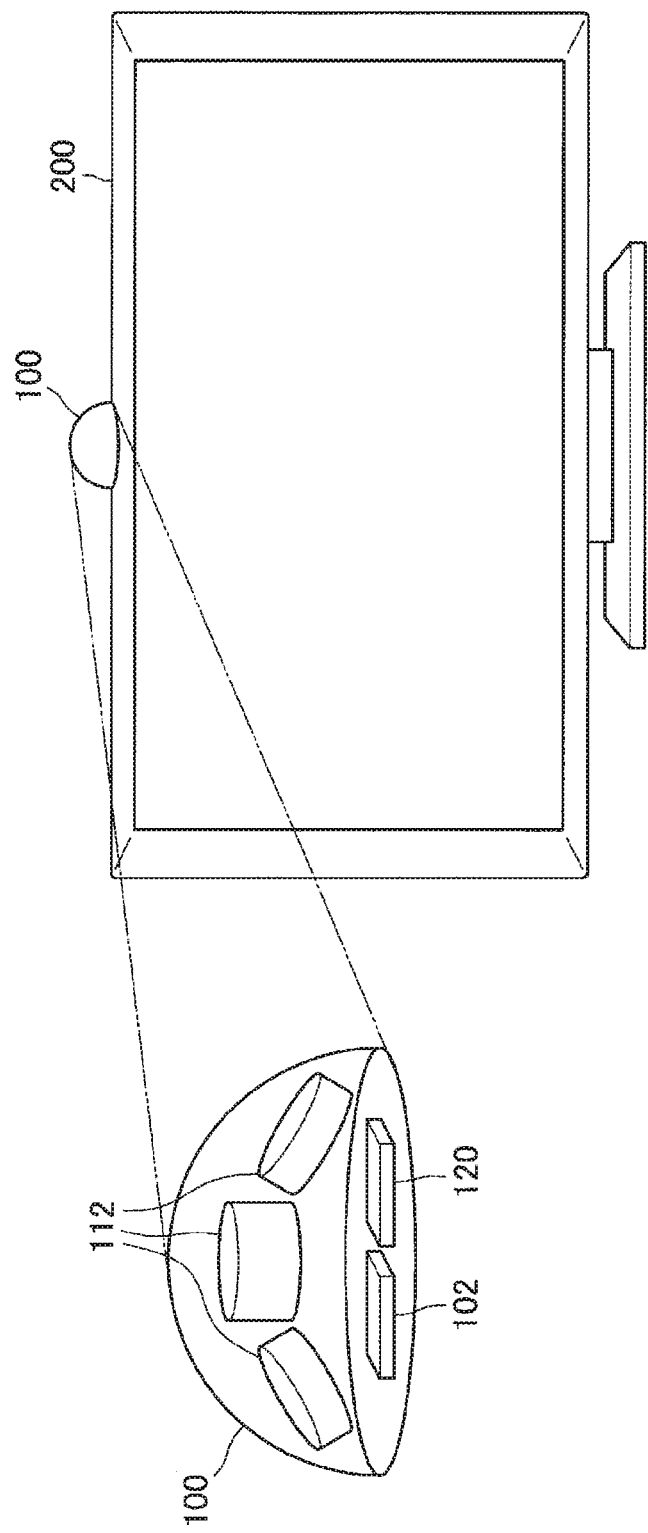
FIG. 1 is a diagram illustrating a schematic configuration example of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

It should be noted that the descriptions will be given in the following order.
1. Outline of System
2. Configuration Example of Device
2-1. Physical Configuration
2-2. Logical Configuration
3. Processing of Device
4. Summary of Basic Configuration
5. Modified Examples
6. Application Examples of System
6-1. Application to Living Space
6-2. Application to Robot
6-3. Application to Wearable device
6-4. Application to Sport
6-5. Application to Vehicle
7. Conclusion

1. OUTLINE OF SYSTEM

Figure 2:
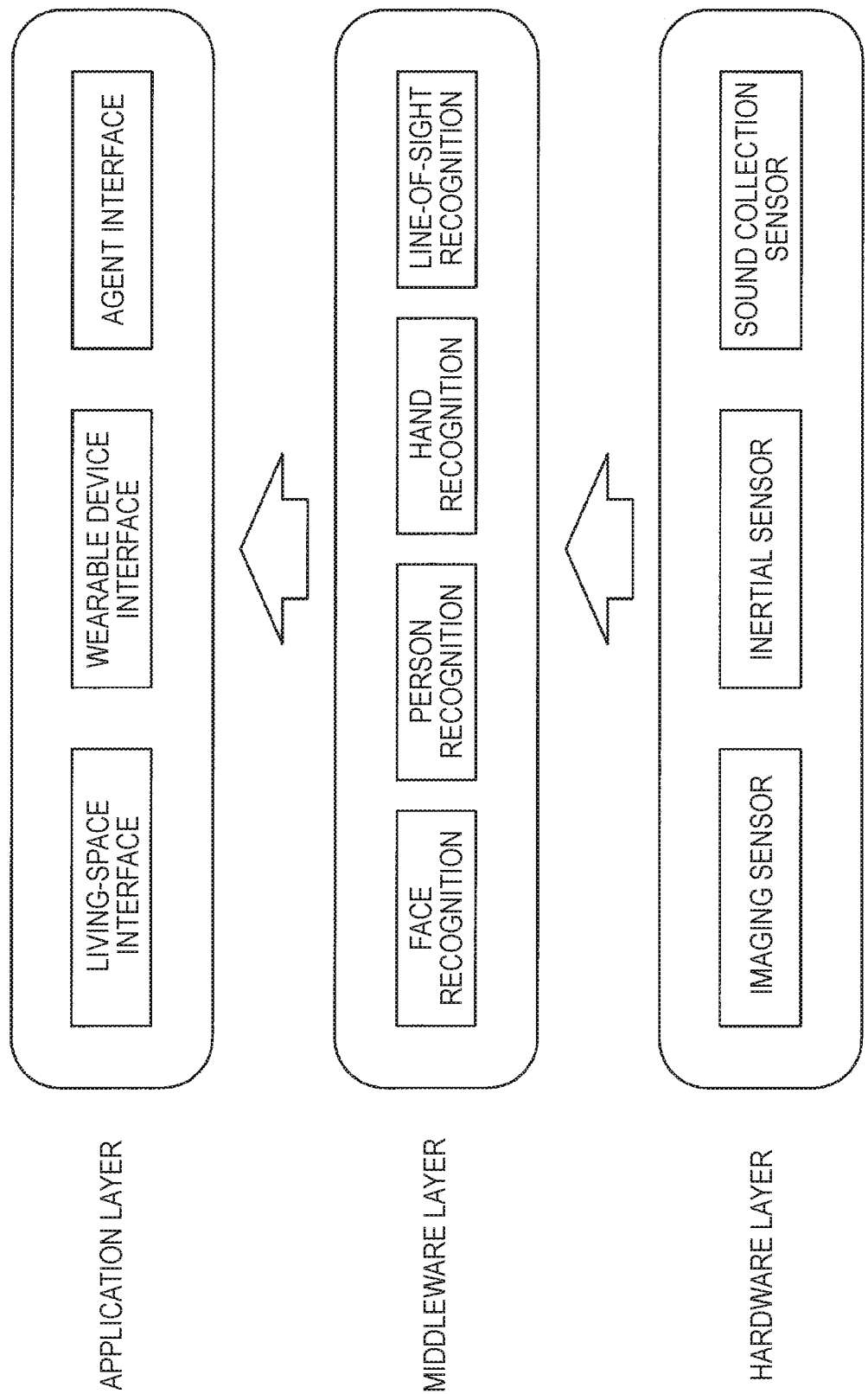
FIG. 2 is a diagram illustrating the configuration example of the information processing system according to the embodiment based on another point of view.

First, a description will be given of the outline of an information processing system according to an embodiment of the present disclosure with reference to FIGS. 1 and 2. FIG. 1 is a diagram illustrating a schematic configuration example of an information processing system according to an embodiment of the present disclosure. FIG. 2 is a diagram illustrating the configuration example of the information processing system according to the present embodiment based on another point of view.

As illustrated in FIG. 1, the information processing system includes an information processing device 100 and an output device 200. It should be noted that the information processing device 100 and the output device 200 are connected to each other via communication. Furthermore, as illustrated in FIG. 1, the information processing device 100 and the output device 200 may be physically connected to each other. Moreover, the information processing device 100 may be detachable.

The information processing device 100 has a function of measuring a situation around the information processing device 100 and a function of performing recognition processing for a result of the measurement. Furthermore, the output device 200 has a function of controlling output on the basis of the result of the recognition processing. Therefore, the information processing system is capable of controlling output from the output device 200 according to the situation around the information processing device 100 which is recognized through the information processing device 100.

Specifically, the information processing device 100 performs sensing the situation around the information processing device 100 using a sensor module 112 included in the information processing device 100. Next, the information processing device 100 performs the recognition processing on the basis of a result of the sensing. Then, the result of the recognition processing is provided to the output device 200, and the output device 200 controls output according to the result of the recognition processing.

For example, as illustrated in FIG. 1, the information processing device 100 is attached to the output device 200, which is a display device. The sensor module 112 included in the information processing device 100 is an imaging sensor module, and the information processing device 100 images the vicinity of the information processing device 100, i.e. the output device 200, using the imaging sensor module to acquire an image. Next, the information processing device 100 performs the recognition processing for a gesture of the user on the basis of the acquired image. Then, the result of the recognition processing is provided to the output device 200, and the output device 200 causes a screen corresponding to the gesture indicated by the result of the recognition processing to be displayed.

Furthermore, a description will be given of the information processing system based on another point of view with reference to FIG. 2. The configuration of the information processing system is classified into three layers. Specifically, the configuration of the information processing system is classified into a hardware layer, a middleware layer, and an application layer. For example, as illustrated in FIG. 2, the information processing system includes a hardware layer having a sensor such as an imaging sensor, an inertial sensor, and a sound sensor, a middleware layer having a recognition function such as face recognition, person recognition, hand recognition, and line-of-sight recognition, and an application layer having a living-space interface, a wearable device interface, an agent (robot) interface, or the like.

For example, in the example of FIG. 1, the information processing device 100 serves as the abovementioned hardware layer and the middleware layer while the output device 200 serves as the abovementioned application layer. However, needless to say, various configurations may be adopted regarding the function of the abovementioned each layer. For example, the information processing device 100 may serve as the abovementioned all layers.

However, as described above, the precision and the acceleration may be required for the abovementioned recognition processing. In this regard, machine learning is typically used for the recognition processing. For example, recognition processing using a classifier (hereinafter, also referred to as "recognizer") is performed. However, as described above, the recognition processing using the past recognizer tended to bring difficulty in increasing the number of users using the recognition processing.

To address this matter, the information processing device 100 in the information processing system according to an embodiment of the present disclosure stores learning information acquired by machine learning and performs recognition processing using the learning information specified on the basis of identification information that is input. In the following, a detail description will be given of the information processing device 100.

2. CONFIGURATION EXAMPLE OF DEVICE

The outline of the information processing system according to one embodiment of the present disclosure has been described above. Next, a description will be given of the information processing device 100, which is a structural element of the information processing system. First, a description will be given of a physical configuration of the information processing device 100.

2-1. Physical Configuration

Figure 3:
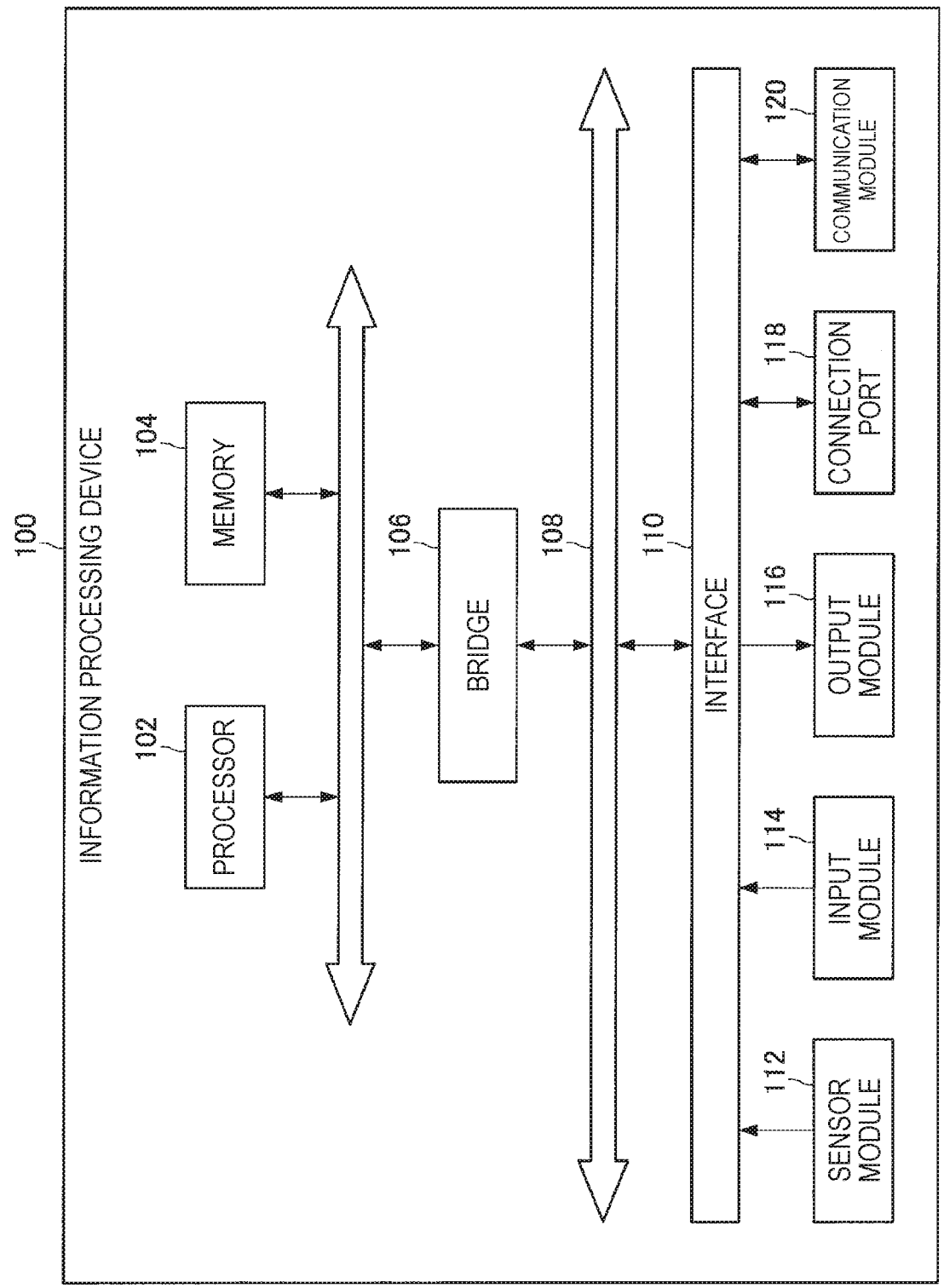
FIG. 3 is a diagram illustrating a schematic physical configuration example of the information processing device according to the embodiment.

With reference to FIG. 3, a description will be given of a physical configuration of the information processing device 100. FIG. 3 is a diagram illustrating a schematic physical configuration example of the information processing device 100 according to the present embodiment.

As illustrated in FIG. 3, the information processing device 100 includes a processor 102, memory 104, a bridge 106, a bus 108, an interface 110, a sensor module 112, an input module 114, an output module 116, a connection port 118, and a communication module 120.

(Processor)

The processor 102 is a control module that functions as an arithmetic processing unit and that cooperates with various types of programs to realize a part of the operation of a processing unit 150 in the information processing device 100. The processor 102 executes, using a control circuit, the programs stored in the memory 104 or another storage medium to operate various logical functions of the information processing device 100 (described later). For example, the processor 102 may be a CPU (Central Processing Unit), a GPU (Graphics Processing Unit), a DPS (Digital Signal Processor), or a SoC (System-on-a-chip).

(Memory)

The memory 104 stores programs, operation parameters, or the like used by the processor 102. For example, the memory 104 includes RAM (Random Access Memory), and temporarily stores the programs that are used in the execution by the processor 102, the parameters that appropriately vary in the execution, and the like. Furthermore, the memory 104 includes ROM (Read Only Memory), and realizes a part of a storage unit 160 in the information processing device 100 by means of the RAM and the ROM. It should be noted that an external storage device may be used as a part of the memory 104 via the connection port, the communication device, or the like. Furthermore, the memory 104 stores learning information that is set to a processing circuit.

The processor 102 and the memory 104 are connected to each other by an internal bus including a CPU bus, and the like.

(Bridge and Bus)

The bridge 106 connects between buses. Specifically, the bridge 106 connects the internal bus to which the processor 102 and the memory 104 are connected, with the bus 108 that connects among the sensor module 112, the input module 114, the output module 116, the connection port 118, and the communication module 120. It should be noted that the sensor module 112, the input module 114, the output module 116, the connection port 118, and the communication module 120 are connected via the interface 110.

(Sensor)

The sensor module 112 includes the imaging sensor that realizes the operation of an imaging unit 130 of the information processing device 100, and generates image information (image data) as sensor information. Specifically, the sensor module 112 includes an imaging element such as a CCD (Charge Coupled Device) or a CMOS (Complementary Metal Oxide Semiconductor), a lens, and an imaging circuit. The lens may be a single-lens or a multi-lens. A captured image generated by the sensor module 112 may be a still image or each of sequential frames constituting a moving image. Furthermore, the imaging sensor may be a visible light sensor, an infrared sensor, or a polarization sensor. It should be noted that the sensor module 112 may be an inertial sensor that measures acceleration, angular velocity, or the like, a sound sensor that measures a sound volume, a frequency, or the like, an environment sensor that measures a temperature, humidity, barometric pressure, or the like, or a biosensor that measures a body temperature, a pulse, sweating, or the like. The sensor module 112 may include a plurality of types of sensors.

(Input Device)

The input module 114 is used by the user operating the information processing device 100 or inputting information to the information processing device 100. For example, the input module 114 includes an input means for the user inputting information, such as a button for starting the information processing device 100, an input control circuit for generating an input signal on the basis of an input by the user and outputting the input signal to the processor 102, and the like. It should be noted that the input means may be a mouse, a keyboard, a touch screen, a switch, a lever, or the like. The user of the information processing device 100 can input various types of data to the information processing device 100 and instructs the information processing device 100 to perform processing, according to the operation of the input module 114.

(Output Device)

The output module 116 is an output module used for providing the user with information. For example, the output module 116 outputs a signal to a LED (Light Emitting Diode) lamp or the like that lights a lamp to indicate the start of the information processing device 100. It should be noted that the output module 116 may perform outputting to an LCD (Liquid Crystal Display) device, an OLED (Organic Light Emitting Diode) device, or a device such as a projector, a speaker, a headset, or the like.

(Connection Port)

The connection port 118 is a port for allowing a device to directly connecting to the information processing device 100. For example, the connection port 118 may be a USB (Universal Serial Bus) port, an IEEE1394 port, a SCSI (Small Computer System Interface) port, or the like. Furthermore, the connection port 118 may be an RS-232C port, an optical audio terminal, an HDMI (High-Definition Multimedia Interface) (Registered Trademark) port, or the like. Data exchange may be performed between the information processing device 100 and an external device through the connection of the external device to the connection port 118.

(Communication Device)

The communication module 120 mediates the communication between the information processing device 100 and the external apparatus to realize the operation of a communication unit 140. For example, the communication module 120 may perform wireless communication in accordance with any wireless communication system including a short-range wireless communication system such as Bluetooth (Registered Trademark), NFC (Near Field Communication), wireless USB, and TransferJet (Registered Trademark), a cellular communication system such as WCDMA (Wideband Code Division Multiple Access) (Registered Trademark), WiMAX (Registered Trademark), LTE (Long Term Evolution), and LTE-A, and a wireless LAN (Local Area Network) system such as Wi-Fi (Registered Trademark). Furthermore, the communication module 120 may perform wired communication through a cable communication.

It should be noted that the information processing device 100 may not include a part of the configuration described with reference to FIG. 3 or may include an additional configuration. Furthermore, a one-chip information processing module in which an entirety or a portion of the configuration described with reference to FIG. 3 is integrated may be provided.

(Processing Circuit)

Figure 4:
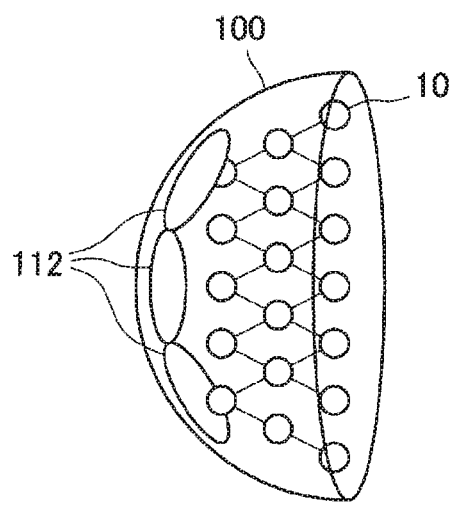
FIG. 4 is a schematic diagram illustrating a processing circuit included in the information processing device according to the embodiment.

Furthermore, although not illustrated in FIG. 3, the information processing device 100 may also include a processing circuit that performs at least a part of the recognition processing on the basis of the learning information acquired by machine learning. The abovementioned recognizer is realized by the processing circuit and the learning information. It should be noted that learning information may also be referred to as recognizer for convenience of explanation. A description will be given of the processing circuit with reference to FIG. 4. FIG. 4 is a schematic diagram illustrating a processing circuit included in the information processing device 100 according to the present embodiment.

The information processing device 100 includes a processing circuit having a plurality of elements 10 and a wire connecting among the plurality of elements 10 as illustrated in FIG. 4. The processing circuit uses the learning information stored in the memory 104 to perform the recognition processing for the sensor information acquired from the sensor module 112. For example, the recognition processing performed by the processing circuit is recognition processing in accordance with neural networks, and the learning information acquired by the abovementioned machine learning is coefficient information used in recognition processing in accordance with the neural networks. The coefficient information is information corresponding to each of the elements 10 included in the processing circuit. The coefficient information is read from the memory 104 before the recognition processing being performed and set for each element 10. If the coefficient information changes, the output of the element 10 also changes, and the output of the processing circuit accordingly changes. In other words, the contents of the recognition processing such as a recognition target changes according to the coefficient information.

Furthermore, the recognition processing in accordance with the neural networks may be recognition processing in accordance with deep learning. Specifically, the elements 10 in the processing circuit are arranged in a multi-layer structure. It should be noted that various types of network connection modes such as the feedforward type and the recurrent type may be employed.

It should be noted that the recognition processing of the information processing device 100 may be recognition processing in accordance with other methods of opportunity learning. For example, the recognition processing may be boosting or SVM (Support Vector Machine). Needless to say, it should be noted that learning information in accordance with each method is stored.

2-2. Logical Configuration

Figure 5:
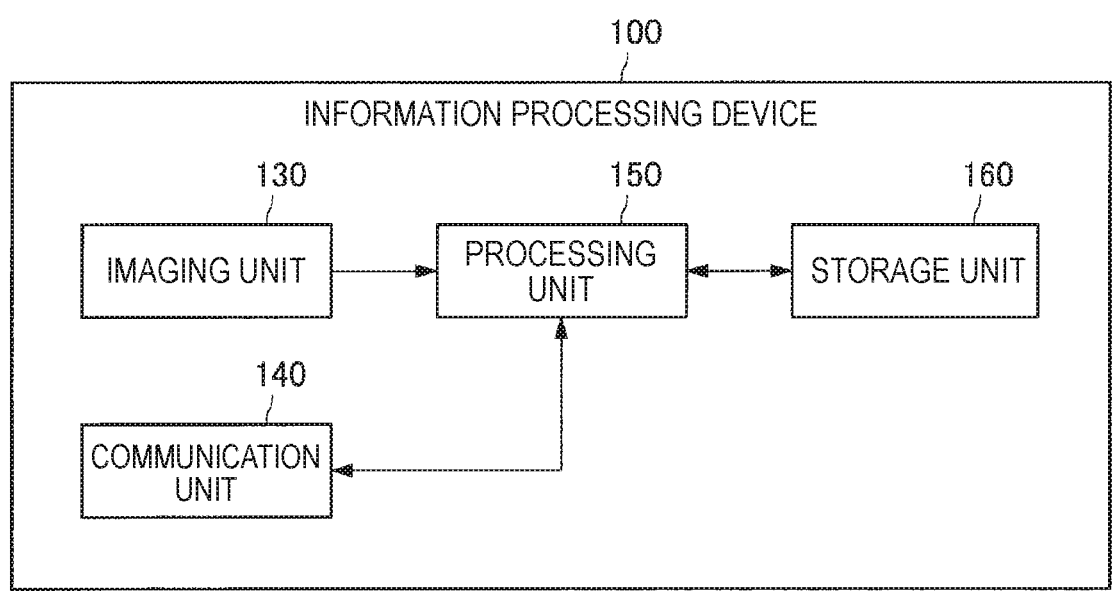
FIG. 5 is a block diagram illustrating a schematic logical configuration example of the information processing device according to the embodiment.

The physical configuration of the information processing system 100 has been described above. Next, a description will be given of a logical configuration of the information processing device 100 with reference to FIG. 5. FIG. 5 is a block diagram illustrating a schematic logical configuration example of the information processing device 100 according to the present embodiment.

As illustrated in FIG. 5, the information processing device 100 includes the imaging unit 130, the communication unit 140, the processing unit 150, and the storage unit 160.

(1) Provision of Sensor Information

Figure 6:
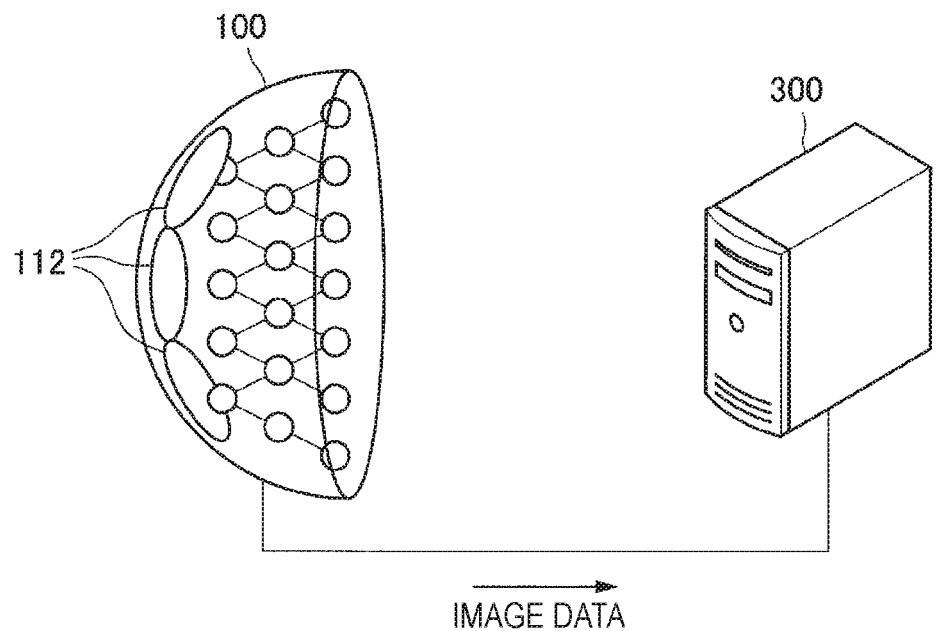
FIG. 6 is a diagram illustrating provision of sensor information by the information processing device according to the embodiment.

First, a description will be given of a function of providing sensor information with reference to FIG. 6. FIG. 6 is a diagram illustrating the provision of sensor information by the information processing device 100 according to the present embodiment. The information processing device 100 provides an external device with the sensor information. Specifically, the processing unit 150 causes the communication unit 140 to transmit image data related to an image acquired through the imaging performed by the imaging unit 130. For example, as illustrated in FIG. 6, the information processing device 100 is connected to the external device 300 via wired communication or wireless communication. The processing unit 150 acquires the image data from the imaging unit 130 and controls to transmit the acquired image data to the external device 300 to which the communication unit 140 is connected. It should be noted that the image data may be used for generating learning information.

(2) Storage of Learning Information

Figure 7:
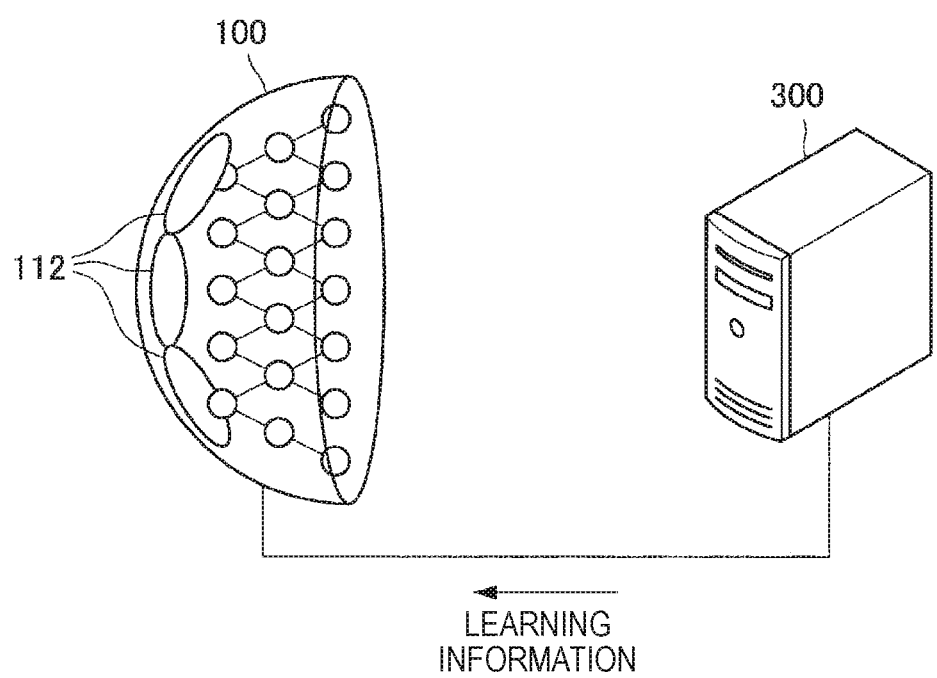
FIG. 7 is a diagram illustrating storage of learning information by the information processing device according to the embodiment.
Figure 8:
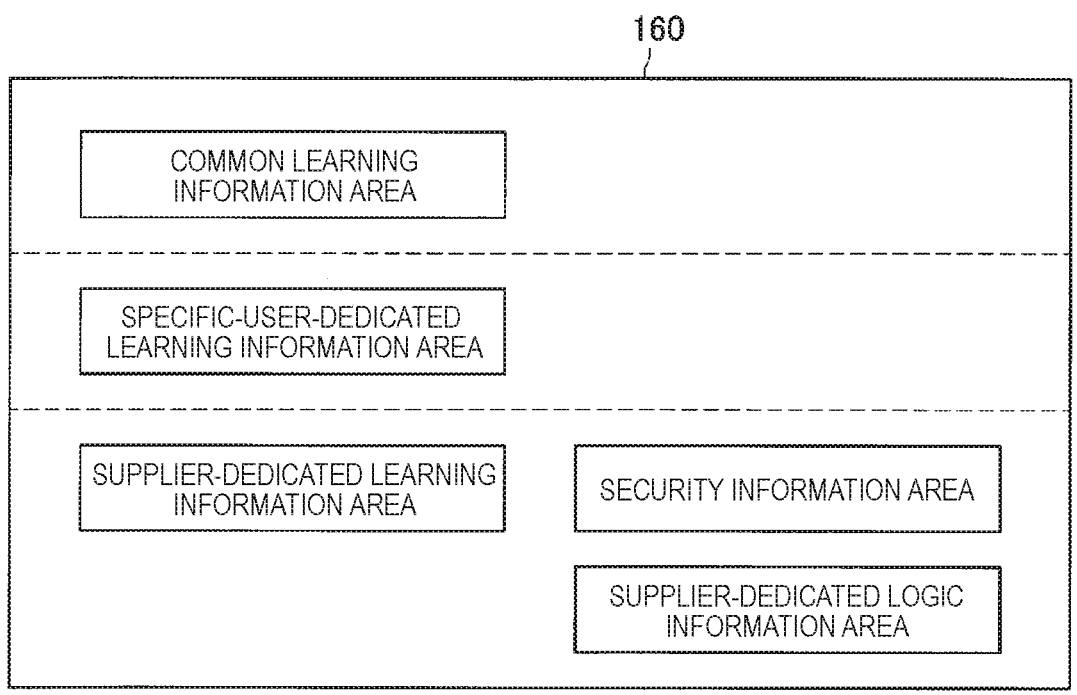
FIG. 8 is a diagram illustrating an example of a storage mode of the information processing device according to the embodiment.

Next, a description will be given of a function of storing learning information with reference to FIGS. 7 and 8. FIG. 7 is a diagram illustrating the storage of learning information by the information processing device 100 according to the present embodiment, and FIG. 8 is a diagram illustrating an example of a storage mode of the information processing device 100 according to the present embodiment. The information processing device 100 stores the learning information and other information. Specifically, the storage unit 160 stores the learning information acquired by the communication unit 140. For example, as illustrated in FIG. 7, the communication unit 140 receives the learning information from the external device 300 to which the information processing device 100 is connected, and the processing unit 150 causes the storage unit 160 to store the received learning information.

Furthermore, the storage unit 160 stores the learning information on the basis of identification information. Specifically, the communication unit 140 receives the learning information and the identification information, and the processing unit 150 controls to store the learning information in an area in the storage unit 160 (hereinafter, also referred to as storage area) that is specified on the basis of the received identification information. More specifically, the storage area of the storage unit 160 is divided into a plurality of types thereof and the storage area is associated with the identification information. When the identification information is received, the processing unit 150 decides the storage area according to the association of the identification information with the storage area. Then, the storage unit 160 stores the learning information in the decided storage area.

Here, the identification information includes information in which a providing destination of a result of the recognition processing is identified (hereinafter, also referred to as providing destination information). Specifically, the providing destination information includes information in which the providing destination such as an application and a device operated by the user or on the basis of the result of the recognition processing is identified. For example, the providing destination information is a user ID (identifier), an application ID, or a device ID.

Furthermore, a detailed description will be given of the storage of learning information based on the identification information with reference to FIG. 8. For example, as illustrated in FIG. 8, the storage area of the storage unit 160 are divided into five areas, which are a common learning information area, a specific-user-dedicated learning information area, a supplier-dedicated learning information area, a security information area, and a supplier-dedicated logic information area. The common learning information area is an area that enables the learning information to be stored by any user (such as a developer and an end user). The specific-user-dedicated learning information area is an area that enables the learning information to be stored by a specific user (such as a developer who made a contract with a supplier). The supplier-dedicated learning information area is an area that enables the learning information to be stored only by a supplier (such as a manufacturer or a distributor of the information processing device 100). Furthermore, personal information relating to users who use the information processing device 100, etc. can be stored in the security information area, and information relating to the operations of the information processing device 100, etc. can be stored in the supplier-dedicated logic information area. Furthermore, the security information area and the supplier-dedicated logic information area are the areas that enable the information to be stored only by the supplier. In addition, the abovementioned identification information is information in which the supplier, the specific user, and the other users are identified.

In addition, the learning information may be additionally stored. Specifically, in a case in which the communication port 140 receives the learning information and the identification information, the processing unit 150 determines whether there is free space of the storage area specified on the basis of the identification information. If it is determined that there is free space in the storage area, the processing unit 150 causes the received learning information to be stored in the storage area. In addition, if it is determined that there is no free space of the storage area, the learning information that has been stored on the basis of the user's instruction may be deleted, and other learning information may be stored in the area that is provided due to the deletion.

Furthermore, the learning information may be changed. Specifically, the processing unit 150 causes the storage unit 160 to change a portion or an entirety of the learning information that has been previously stored. More specifically, learning information that is changed is generated on the basis of transfer from the learning information that has been stored. For example, the information processing device 100 transmits to the external device the learning information that the supplier caused to be stored in the storage unit 160 in advance and input data and a result of the recognition processing using the learning information. Then, the transfer learning based on the received input data and the result of recognition processing is applied to the received learning information in the external device, and the learning information acquired through the transfer learning is transmitted to the information processing device 100. Then, the storage unit 160 overwrites the previous learning information with the received learning information in the information processing device 100. In addition, the received learning information may be stored as other learning information.

(3) Recognition Processing

The information processing device 100 performs recognition processing using the learning information specified on the basis of the identification information. Specifically, the identification information is notified from the providing destination of the result of the recognition processing, and in a case in which the identification information is notified, the processing unit 150 performs the recognition processing for sensor information using the learning information stored in the storage unit 160 that is specified on the basis of the notified identification information. More specifically, in a case in which the communication unit 140 receives a device ID from the output device 200, the processing unit 150 acquires from the storage unit 160 coefficient information stored in the storage area that is specified based on the device ID. Then, the processing unit 150 sets the acquired coefficient information to a processing circuit to cause the processing circuit to perform the recognition processing for an image acquired from the imaging unit 130. Examples of a recognition target in the recognition processing include the presence or absence of an object such as a face, a hand, and a person, as described above, or a state of an object such as a posture and a line of sight. In addition, the identification information may be notified together with a recognition processing request, or may be notified separately. Furthermore, the recognition processing includes the provision of a recognition result. Specifically, as a part of the recognition processing, the processing unit 150 provides a recognition result output from the processing circuit to the user, an application, or a device such as the output device 200. For example, the recognition result may be directly presented to the user visually or audibly, and information indicating the recognition result may be provided to the application or the device so that the recognition result is presented to the user via the application or the device.

In addition, the identification information may be information other than the abovementioned providing destination information. Specifically, the identification information includes information in which a recognition target in the recognition processing is identified (hereinafter, also referred to as recognition target information), and the processing unit 150 performs recognition processing using the learning information specified from the recognition target information. The recognition target information is, for example, information in which a function of the application or the device is identified (hereinafter, also referred to as function information), and, in a case in which the communication unit 140 receives the function information, the processing unit 150 acquires from the storage unit 160 the learning information used for recognizing a recognition target that is specified from the function information. Then, the processing unit 150 sets the acquired learning information to the processing circuit to cause the processing circuit to perform the recognition processing. In addition, the association of the function information with the recognition target or the learning information may be stored in advance in the information processing device 100, or the association may be acquired via a communication from an external device.

In addition, a plurality of pieces of learning information specified from the identification information may be provided. Specifically, the processing unit 150 performs the recognition processing using the learning information stored in a plurality of the storage areas specified from the identification information. For example, in a case in which two storage areas, which are the common learning information area and the specific-user-dedicated learning information area as shown in FIG. 8, are specified from the identification information, the processing unit 150 performs the recognition processing using the plurality of pieces of learning information stored in both the storage areas.

(4) Change of Recognition Target

The information processing device 100 changes the recognition processing on the basis of the identification information. Specifically, recognition information is included in a change request of the recognition processing that is transmitted from the providing destination of the result of the recognition processing, and, in a case in which the change request is received, the processing unit 150 changes the learning information used for the recognition processing to the learning information that is specified from the identification information included in the change request. For example, in a case in which the communication unit 140 receives a change request including the function information from the output device 200, the processing unit 150 determines whether the function information included in the change request coincides with the function information relating to the learning information used for the current recognition processing. If it is determined that the former function information coincides with the latter function information, the processing unit 150 ends the processing with the learning information being sustained. On the other hand, if it is determined that the former function information does not coincide with the latter function information, the processing unit 150 changes the learning information used for the recognition processing to the learning information included in the change request. It should be noted that the abovementioned change request may be generated on the basis of the user operation for the output device 200.

3. PROCESSING OF DEVICE

Figure 9:
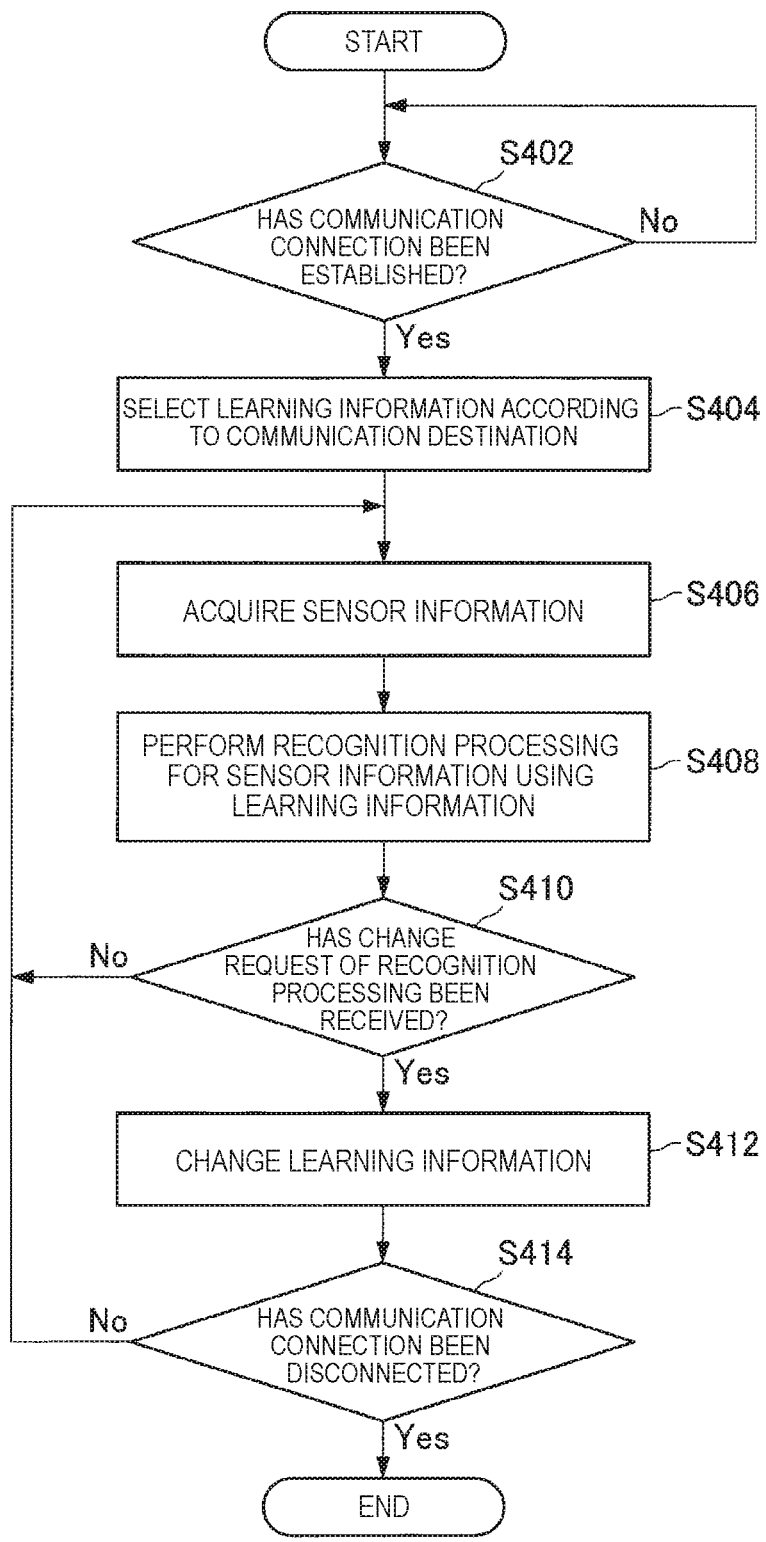
FIG. 9 is a flow chart conceptually illustrating processing of the information processing device according to the embodiment.

Next, a description will be given of the processing of the information processing device 100 according to the present embodiment with reference to FIG. 9. FIG. 9 is a flow chart conceptually illustrating the processing of the information processing device 100 according to the present embodiment. It should be noted that the processing of the information processing device 100 is realized by the cooperation between the logical configuration (software) and the physical configuration (hardware) as described above.

The information processing device 100 determines whether a communication connection has been established (Step S402). Specifically, the processing unit 150 determines whether the communication connection with the output device 200 has been established by the communication unit 140.

If it is determined that the communication connection has been established, the information processing device 100 selects learning information according to a communication destination (Step S404). Specifically, once the communication connection is established by the communication unit 140, the processing unit 150 acquires the learning information that is stored in the storage unit 160 according to the device, which is a connection destination of the communication connection or an application that is operated in the device.

Next, the information processing device 100 acquires sensor information (Step S406). Specifically, the imaging unit 130 regularly images the vicinity of the information processing device 100. Then, the imaging unit 130 provides the images acquired by the imaging to the processing unit 150.

Next, the information processing device 100 performs the recognition processing for the sensor information using the learning information (Step S408). Specifically, the processing unit 150 sets the acquired learning information to a processing circuit to initialize the recognition processing state and causes the processing circuit to perform the recognition processing for the images provided from the imaging unit 130. Then, the processing unit 150 causes the communication unit 140 to transmit a result of the recognition processing to the output device 200, which is a communication destination.

Next, the information processing device 100 determines whether the change request of the recognition processing has been received (Step S410). Specifically, the processing unit 150 determines whether the change request including the function information from the output device 200 has been received by the communication unit 140.

If it is determined that the change request of the recognition processing has been received, the information processing device 100 changes the learning information (Step S412). Specifically, if it is determined that the change request has been received by the communication unit 140, the processing unit 150 acquires from the storage unit 160 the learning information for recognizing a recognition target that is specified from the function information included in the change request. Then, the processing unit 150 sets the acquired learning information to be the learning information used in the recognition processing.

Next, the information processing device 100 determines whether the communication connection has been disconnected (Step S414). Specifically, the processing unit 150 determines whether the communication connection with the output device 200 has been disconnected.

In addition, if it is determined that the change request of the recognition processing has not been received in Step S410, or if it is determined that the communication connection has not been disconnected in Step S414, the processing returns to Step S406, and the recognition processing using the learning information that has been set is performed.

4. SUMMARY OF BASIC CONFIGURATION

As described above, according to one embodiment of the present disclosure, the information processing device 100 stores the learning information acquired by machine learning and performs recognition processing using the learning information specified on the basis of the acquired identification information. With such a configuration, the contents of the recognition processing are enabled to be controlled according to the association of the identification information with the learning information. Therefore, the association enables excess and deficiency of the provided recognition processing to be suppressed. Accordingly, the suppression of deficiency of the provided recognition processing enables the suppression of reduction of the degree of the user satisfaction, and the suppression of excess of the provided recognition processing enables the reduction in cost of use or the acceleration of processing. Consequently, increasing the number of users using the recognition processing is enabled.

Furthermore, the recognition processing includes recognition processing according to neural networks, and the learning information includes coefficient information in the neural networks. With such a configuration, the recognition processing for images, etc. with a relatively less calculation amount than those of other methods is enabled. Therefore, the shortening of the time spent until the provision of the recognition result is enabled. Furthermore, a portion or an entirety of the recognition processing can be converted into hardware implementation, whereby the acceleration of processing is enabled.

Furthermore, the neural networks include neural networks arranged in a multi-layer structure. With such a configuration, the recognition processing for another recognition object can be performed by simply changing the coefficient information. Therefore, it is unnecessary to provide a configuration for each recognition target in order to perform the recognition processing, whereby the reduction in cost is enabled by simplifying the configuration of the information processing device 100.

Furthermore, the abovementioned identification information includes the information in which the providing destination of the result of the abovementioned recognition processing is identified. With such a configuration, the recognition processing using the learning information corresponding to the providing destination is performed, whereby the elimination of the communication with the providing destination for performing the recognition processing is enabled. Therefore, the processing time prior to the recognition processing is reduced, whereby the reduction of a time rag from the time when the communication connection is established until the time when a result of the recognition processing is provided is enabled.

Furthermore, the abovementioned providing destination includes the application or the device that is operated by the user or on the basis of the result of the abovementioned recognition processing. With such a configuration, the result of the recognition processing is provided that corresponds to the type or the layer of the providing destination, whereby the elimination of an operation or processing with respect to the result of the recognition processing at the providing destination is enabled. Therefore, user's grasping of the result of the recognition processing can be facilitated, whereby the reduction of a processing load of the application or the device is enabled.

Furthermore, the abovementioned identification information includes information in which the recognition target is identified. With such a configuration, the recognition processing is performed after the recognition target being identified, whereby the occurrence of inconsistency of the recognition target between the providing destination (requestor) of the recognition processing and the information processing device 100 can be inhibited. Therefore, such a configuration enables a situation to be provided in which the recognition result desirable for the requestor of the recognition processing is likely to be provided. Furthermore, the recognition processing tends to be faster if the recognition target is specified. Therefore, the acceleration of a response of the recognition result is enabled.

Furthermore, the abovementioned identification information is notified from the providing destination of the result of the abovementioned recognition processing. With such a configuration, the identification information relating to the selection of the learning information is notified from the requestor of the recognition processing, whereby the occurrence of inconsistency of the abovementioned recognition targets can be reliably inhibited.

Furthermore, the abovementioned learning information is stored in the storage area that is specified from the identification information. With such a configuration, the storage area corresponding to the identification information is secured, whereby the storage of the learning information corresponding to various situations is enabled. Particularly, in a case in which the identification information is user (such as an end user and a developer) identification information, the storage area that is available is secured for each user. Therefore, such a configuration enables each user to select the learning information to be stored, leading to the customization of not only the recognition processing but also the information processing device 100. Therefore, the user's convenience with respect to the information processing device 100 can be improved, whereby it is possible to give motivation for using the information processing device 100 to more users.

Furthermore, the information processing device 100 additionally stores the abovementioned acquired learning information. With such a configuration, the learning information can be added later, whereby the provision of more opportunities for the user to customize is enabled. Furthermore, the number of recognition targets can also be increased later, whereby increasing the opportunities for using the information processing device 100 is enabled.

Furthermore, the information processing device 100 changes the learning information that has been stored. With such a configuration, the learning information is changed to learning information having higher precision or higher accuracy, whereby the availability of the recognition processing result can be improved. Therefore, the improvement of the processing quality in the case of using the result of the recognition processing at the providing destination of the result of the recognition processing is enabled.

Furthermore, the learning information that is changed is generated on the basis of transfer from the learning information that has been stored. With such a configuration, highly evaluated learning information, for example, learning information having a low error rate, among a plurality of pieces of the learning information that have been stored in advance is used for the modification of learning information, whereby the generation of effectively improved learning information is enabled.

Furthermore, a plurality of pieces of the learning information are specified from the abovementioned identification information, and the information processing device 100 performs the abovementioned recognition processing using the plurality of pieces of the learning information. With such a configuration, the recognition processing is performed with the combination of the plurality of pieces of the learning information, whereby the expansion in the scope of the recognition targets or the improvement of precision or accuracy of the result of the recognition processing is enabled.

Furthermore, the recognition targets in the abovementioned recognition processing include the presence or absence of an object or the state of the object. Here, since there are various types of objects, the improvement of precision and the acceleration of the recognition processing is often difficult. In this regard, the information processing device 100 according to the present embodiment is applied to object recognition, whereby more precise and accelerated object recognition is enabled.

Furthermore, the information processing device 100 further includes a sensor module that generates sensor information, and performs the recognition processing for the sensor information. With such a configuration, since the sensor module is included in the information processing device 100, it is possible to provide the device that performs processing from the sensing to the recognition processing in one succession. Accordingly, it is possible to perform the processing corresponding to the condition that is subject to sensing even in a device without a sensor or a recognition processing function. Furthermore, it is also possible to eliminate the sensor or the recognition processing function from a device involving them, whereby the reduction in cost of the device is enabled.

5. MODIFIED EXAMPLES

One embodiment of the present disclosure has been described above. It should be noted that the present embodiment is not limited to the examples as described above. In the following, a description will be given of the first to third modified examples of the present embodiment.

First Modified Example

As the first modified example of the present embodiment, the identification information may be information other than the providing destination information and the function information. Specifically, the identification information may be information in which a location relating to a recognition target in the abovementioned recognition processing is identified (hereinafter, also referred to as location information). More specifically, the location information is generated on the basis of sensor information, and the processing unit 150 then performs recognition processing using the learning information that is specified from the generated location information. For example, the processing unit 150 estimates the location of the information processing device 100 on the basis of the image acquired by imaging of the imaging unit 130. The processing unit 150 then acquires from the storage unit 160 the learning information corresponding to the estimated location. Furthermore, for example, the information processing device 100 separately includes a temperature sensor, and the processing unit 150 may perform the recognition processing using the learning information that is specified from temperature information acquired from the temperature sensor. Specifically, the processing unit 150 determines whether the information processing device 100 is located indoors or outdoors on the basis of the temperature information acquired from the temperature sensor. The processing unit 150 then performs the recognition processing using the learning information corresponding to the case of the information processing device 100 being located indoors or outdoors. It should be noted that the sensor information is not limited to the abovementioned sensor information. In addition to the abovementioned sensor information, various types of sensor information such as positional information acquired from a GPS (Global Positioning System) sensor may also be used.

Furthermore, the identification information may be information in which a time slot relating to a recognition target in the abovementioned recognition processing is identified (hereinafter, also referred to as time slot information). Specifically, the time slot information is generated on the basis of the sensor information, and the processing unit 150 performs the recognition processing using the learning information that is specified from the generated time slot information. For example, the processing unit 150 estimates a time slot on the basis of the image acquired by the imaging of the imaging unit 130. The processing unit 150 then acquires from the storage unit 160 the learning information corresponding to the estimated time slot. More specifically, the learning information having a lower error rate of the recognition processing during the daytime than that of any other learning information is associated with the time slot information indicating the daytime, and, in a case in which the time slot information indicates the daytime, the processing unit 150 acquires from the storage unit 160 the learning information corresponding to the daytime.

Figure 10:
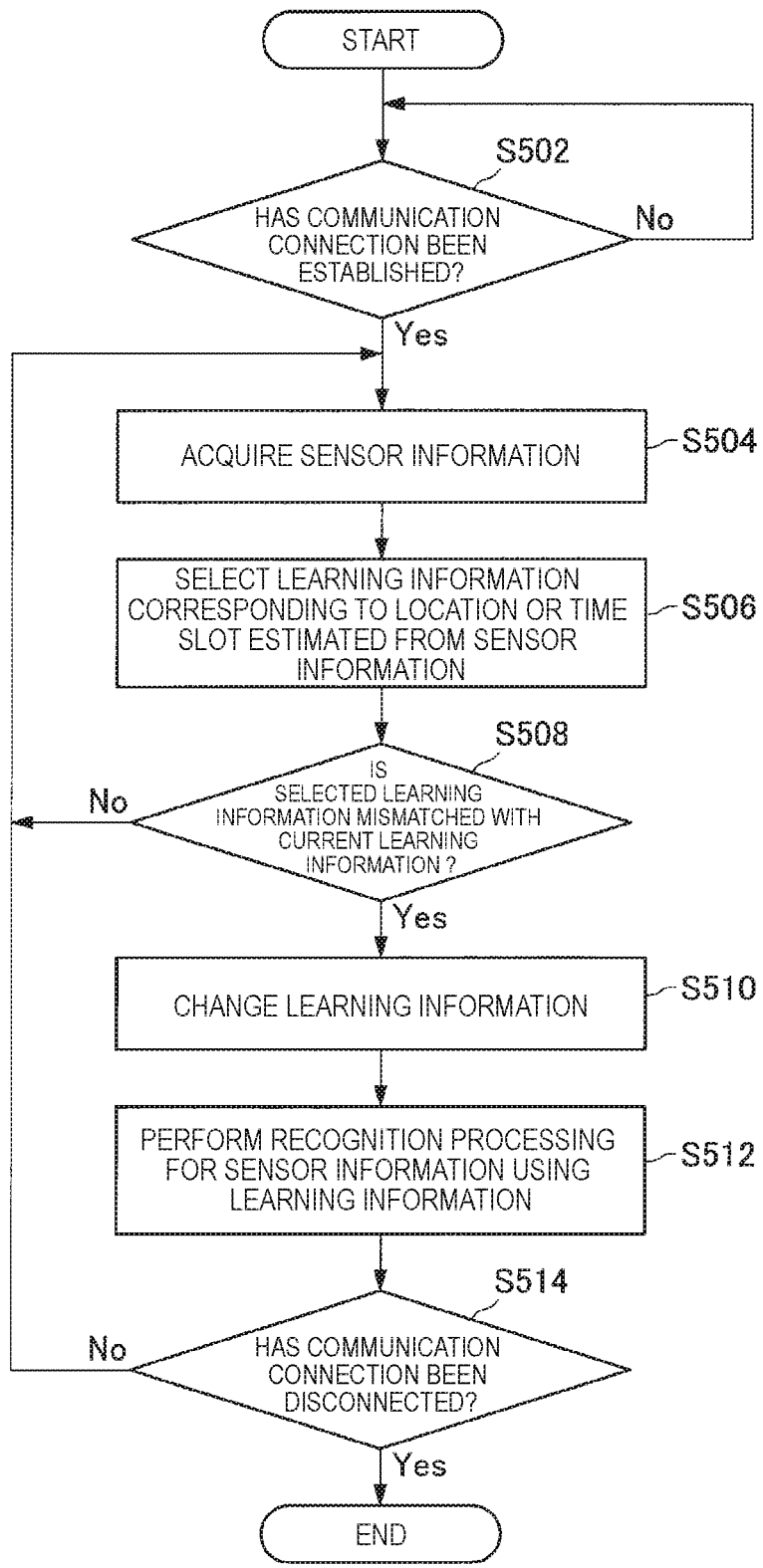
FIG. 10 is a flow chart conceptually illustrating processing of an information processing device according to a first modified example of the embodiment.

Furthermore, a description will be given of a flow of processing of the information processing device 100 according to the present modified example with reference to FIG. 10. FIG. 10 is a flow chart conceptually illustrating the processing of the information processing device 100 according to the first modified example of the present embodiment. It should be noted that a description will be omitted for processing that is substantially identical to the abovementioned processing.

The information processing device 100 determines whether a communication connection has been established (Step S502), and, if it is determined that the communication connection has been established, acquires sensor information (Step S504).

Next, the information processing device 100 selects the learning information corresponding to a location or a time slot that is estimated from the sensor information (Step S506). Specifically, the processing unit 150 estimates from the sensor information the location where a recognition target is located or the time slot in recognition processing. It should be noted that an estimation result may be acquired from an external device. The processing unit 150 then acquires from storage unit 160 the learning information that is specified from the location or the time slot.

Next, the information processing device 100 determines the coincidence between the selected learning information and the current learning information (Step S508). Specifically, the processing unit 150 determines whether the acquired learning information coincides with the learning information that has been currently set. It should be noted that the coincidence between the recognition targets that are specified from the learning information may be determined, in place of the coincidence of the learning information.

If it is determined that the abovementioned two pieces of the learning information do not coincide therebetween, the information processing device 100 changes the learning information (Step S510). Specifically, if it is determined that the acquired learning information does not coincide with the learning information that has been set, the processing unit 150 sets the acquired learning information to be learning information used for the recognition processing.

Next, the information processing device 100 performs the recognition processing for the sensor information using the learning information (Step S512). Specifically, the processing unit 150 performs the recognition processing for the image data acquired from the imaging unit 130 using the changed learning information.

Next, the information processing device 100 determines whether the communication connection has been disconnected (Step S514), and, if it is determined that the communication connection has been disconnected, causes the processing to end.

As described above, according to the first modified example of the present embodiment, the identification information is information in which the location relating to a recognition target in the recognition processing is identified. Therefore, by selecting the learning information that is suitable for the location relating to the recognition target, the recognition processing corresponding to each location can be optimized. Accordingly, the inhibition of the variation in the recognition rates corresponding to locations is enabled.

Furthermore, the identification information is information in which the time slot relating to a recognition target in the recognition processing is identified. Therefore, by selecting the learning information that is suitable for the time slot relating to the recognition target, the recognition processing can be optimized in accordance with the time slot. Accordingly, the inhibition of the variation in the recognition rates corresponding to time slots is enabled.

Furthermore, the information in which the abovementioned location or time slot is identified is generated on the basis of sensor information. Therefore, by generating the location information or the time slot information from the sensor information in the condition in which the recognition target is situated, the learning information based on the condition can be selected. Accordingly, performing the recognition processing on the basis of the condition is enabled.

Second Modified Example

In the second modified example of the present embodiment, a plurality of the information processing devices 100 cooperate with each other. Specifically, the information processing device 100 performs the recognition processing for the sensor information that is specified on the basis of information relating to a sensor of another information processing device 100. Specifically, each of the plurality of the information processing devices 100 shares the pieces of setting information of their sensor modules 112, and generates sensor information having a complementary relationship or an overlapping relationship with other sensor information on the basis of the setting information. Each of the information processing device 100 then performs the recognition processing for each of the pieces of generated sensor information, respectively. For example, a case is considered in which the information processing device 100 is provided on the top of the output device 200 as illustrated in FIG. 1, and another information processing device 100 (although not illustrated) is provided in the vicinity of the output device 200. In such a case, the information processing device 100 provided on the output device 200 and another information processing device 100 share their imaging areas with each other via communication. Next, each of the information processing devices 100 sets the imaging unit 130 in such a manner that their imaging areas do not overlap or substantially coincide with each other. Each of the information processing devices 100 then performs the recognition processing for the image acquired by the imaging with the setting.

Furthermore, in place of or in addition to the setting information, sensor information as an input of the recognition processing may be generated on the basis of the pieces of shared sensor information. Specifically, each of the information processing devices 100 shares their individual sensor information, respectively, and generates sensor information having a complementary relationship or an overlapping relationship with other sensor information on the basis of the pieces of shared sensor information. Each of the information processing devices 100 then performs the recognition processing for each of the pieces of generated sensor information, respectively. For example, in the case of FIG. 1 as described above, the information processing device 100 provided on the output device 200 and another information processing device 100 share image data with each other via communication. Next, each of the information processing devices 100 shapes the images so that the subjects in the images do not overlap or substantially coincide with each other. Each of the information processing devices 100 then performs the recognition processing for the shaped images.

As described above, according to the second modified example of the present embodiment, the information processing device 100 performs the recognition processing for the sensor information that is specified on the basis of the information relating to the sensor of another information processing device 100. With such a configuration, the recognition processing is performed through the cooperation with another information processing device 100, whereby the speed or the quality of the recognition processing provided by the information processing device 100 can be improved. Particularly, if the plurality of the information processing devices 100 operate so as to be complementary to each other, the expansion in the recognition range is enabled, and, if the plurality of the information processing devices 100 performs the same operation, the improvement of precision or accuracy of the recognition processing is enabled.

Third Modified Example

Figure 11:
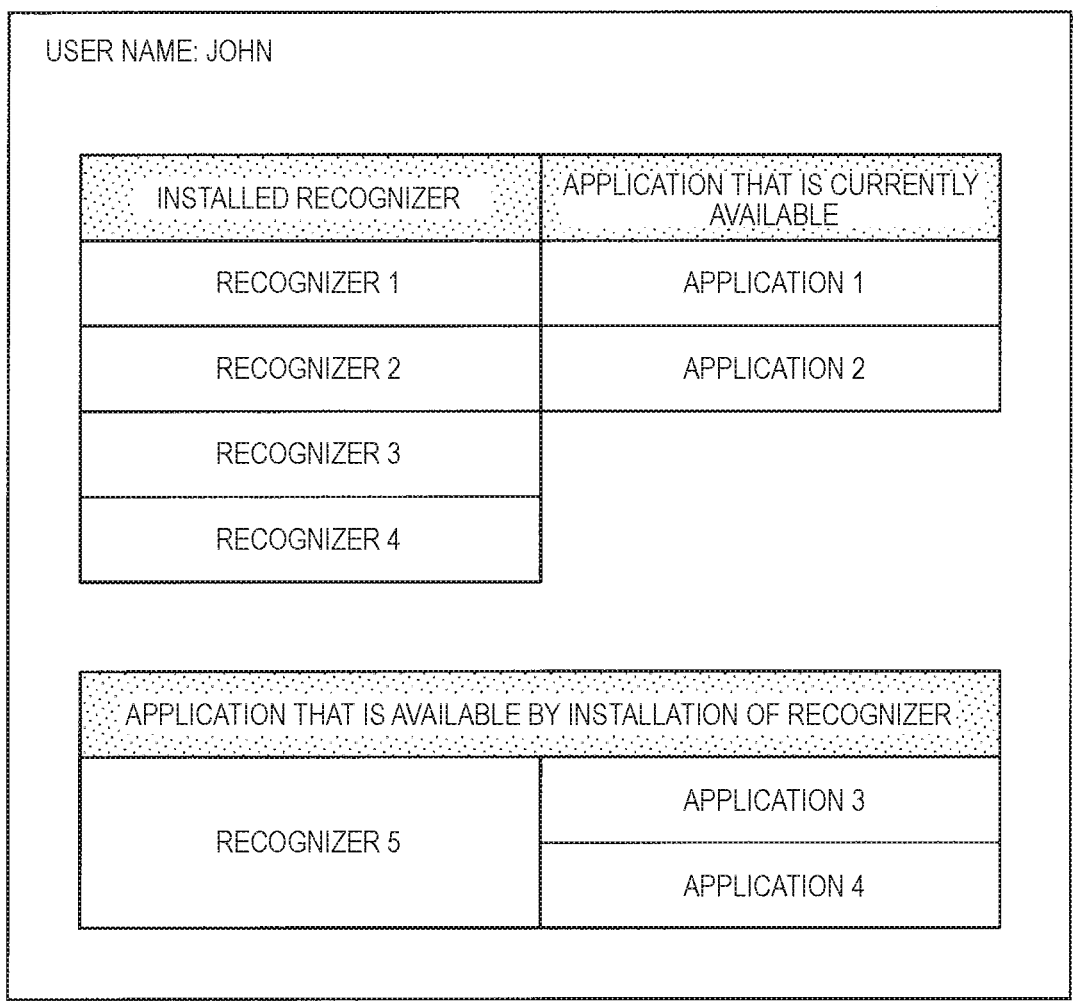
FIG. 11 is a diagram illustrating a screen example showing a setting condition of a recognizer output by an information processing device according to a third modified example of the embodiment.

In the third modified example of the present embodiment, a setting condition of a recognizer of the information processing device 100 may be presented to the user. Specifically, the information processing device 100 outputs information for users that is generated on the basis of the learning information stored in the storage unit 160. Furthermore, a detailed description will be given of the present modified example with reference to FIG. 11. FIG. 11 is a diagram illustrating a screen example showing a setting condition of a recognizer output by the information processing device 100 according to the third modified example of the present embodiment.

If a disclosure of the setting condition is requested from an external device via communication, the processing unit 150 generates information in which the setting condition is specified (hereinafter, also referred to as setting condition information). For example, the communication unit 140 receives a setting condition disclosure request from an external device, and, once the setting condition disclosure request is received, the processing unit 150 specifies the learning information that has been stored in the storage unit 160. The processing unit 150 then generates setting condition information that indicates the specified learning information.

Next, the processing unit 150 provides the generated setting condition information to the external device, which is a requestor. For example, the processing unit 150 causes the communication unit 140 to transmit the generated setting condition information.

The output device 200 outputs information to users on the basis of the provided setting condition information. For example, the output device 200 generates an image showing a setting condition of the information processing device 100 to display a screen including the image, as illustrated in FIG. 11. As an example, the pieces of learning information that have been stored in the information processing device 100 are displayed as installed recognizers in the image.

It should be noted that, in addition to the learning information that has been stored, applications or devices using the recognition processing using the learning information may be displayed. For example, the information processing device 100 or the output device 200 specifies applications that are available on the basis of the setting condition information and generates the information indicating the specified applications. The output device 200 then displays a list of the applications that are currently available on the basis of the information indicating the applications, as illustrated in FIG. 11.

Furthermore, in addition to the applications relating to the learning information that have been stored as described above, an application that is to be available by learning information being additionally stored may be displayed. For example, the information processing device 100 or the output device 200 specifies learning information other than the learning information included in the setting condition information, and specifies an application that becomes available in a case in which the specified learning information is stored. The output device 200 then displays a list of the applications that become available by the installation of the recognizers on the basis of the information indicating the specified applications, as illustrated in FIG. 11.

In addition, if the information processing device 100 includes a display unit such as a display screen, the information processing device 100 may solely perform the abovementioned processing, which is performed by the information processing device 100 and the output device 200.

As described above, according to the third modified example of the present embodiment, the information processing device 100 outputs the information for users that is generated on the basis of the learning information stored in the storage unit 160. With such a configuration, the user can grasp the recognizers that have been installed in the information processing device 100. Therefore, motivation for causing more recognizers, i.e. learning information, which are insufficient, to be additionally stored is given to the user, whereby the promotion of use of the learning information, i.e. use of the information processing device 100, is enabled.

6. APPLICATION EXAMPLES

The information processing device 100 according to the present embodiment and the modified examples has been described above. The information processing device 100 may be applied to a variety of conditions. A description will be given of the application examples of the information processing device 100 in the following.

6-1. Application to Living Space

The information processing device 100 may be used in a human living space. Specifically, one or a plurality of the information processing devices 100 are provided in a living space and perform the recognition processing for a person existing in the living space. For example, in a case in which the information processing device 100 is provided to the output device 200 such as a television, as illustrated in FIG. 1, the information processing device 100 images a viewer of the television and recognizes a face, a hand, a line of sight, a motion and the like of the viewer appearing in the image acquired by the imaging. The output from the television changes corresponding to a recognition result. It should be noted that the setting location of the information processing device 100 is not particularly limited, and thus provided to, for example, a wall, a desk, and the like. If the information processing device 100 is applied to a device provided to such a human living space, such as home electric appliances, such home electric appliances can be operated so as to correspond to a person's behavior. Accordingly, the improvement of convenience of a person's everyday life is enabled.

6-2. Application to Robot

Figure 12:
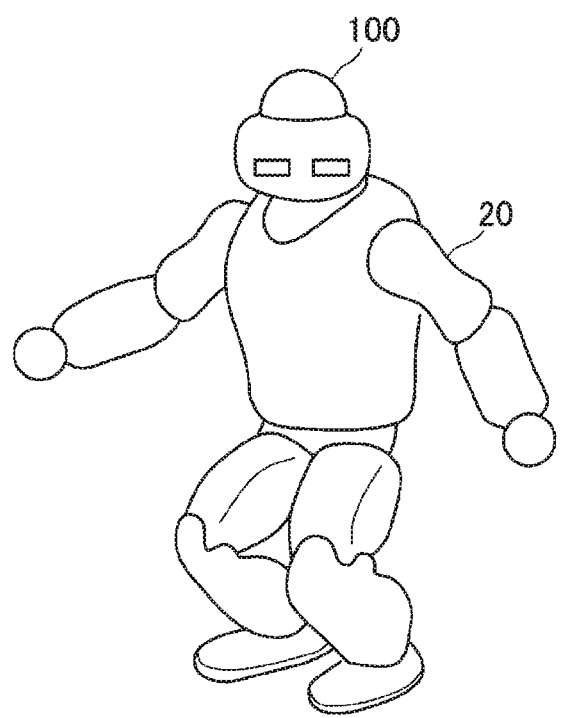
FIG. 12 is a diagram illustrating an example of the information processing device according to the embodiment being applied to a robot.

The information processing device 100 may be applied to robot control. Specifically, the information processing device 100 is incorporated into or mounted to a robot as a component of the robot, and provides a control module of the robot with a result of the recognition processing. Then, the control module of the robot controls to operate an actuator on the basis of the result of the recognition processing to implement actions of the robot. FIG. 12 is a diagram illustrating an example of the information processing device 100 according to the present embodiment being applied to a robot. For example, as illustrated in FIG. 12, the information processing device 100 is provided at a part having a broader range for recognition targets, such as a head of a robot 20, than the other parts of the robot 20. The information processing device 100 performs the recognition processing for persons in the image acquired by the imaging around the robot 20. Then, the control module of the robot 20 controls to operate a moving actuator such as a leg so as to follow a person who is recognized by the recognition processing. As described above, the information processing device 100 is used in a manner similar to a human sensory organ such as visual sense, whereby the promotion of acceleration or facilitation of actions of the robots is enabled. Furthermore, the process of developing sensing and recognition processing in robotic development can be eliminated, whereby shortening the development period of robot and the reduction in development cost are enabled. It should be noted that the example of a robot to be applied is not limited to a walking robot as illustrated in FIG. 12, and may include a vehicle-type robot, a flight-type robot, a ship-type robot, or an industrial robot.

6-3. Application to Wearable Device

Figure 13:
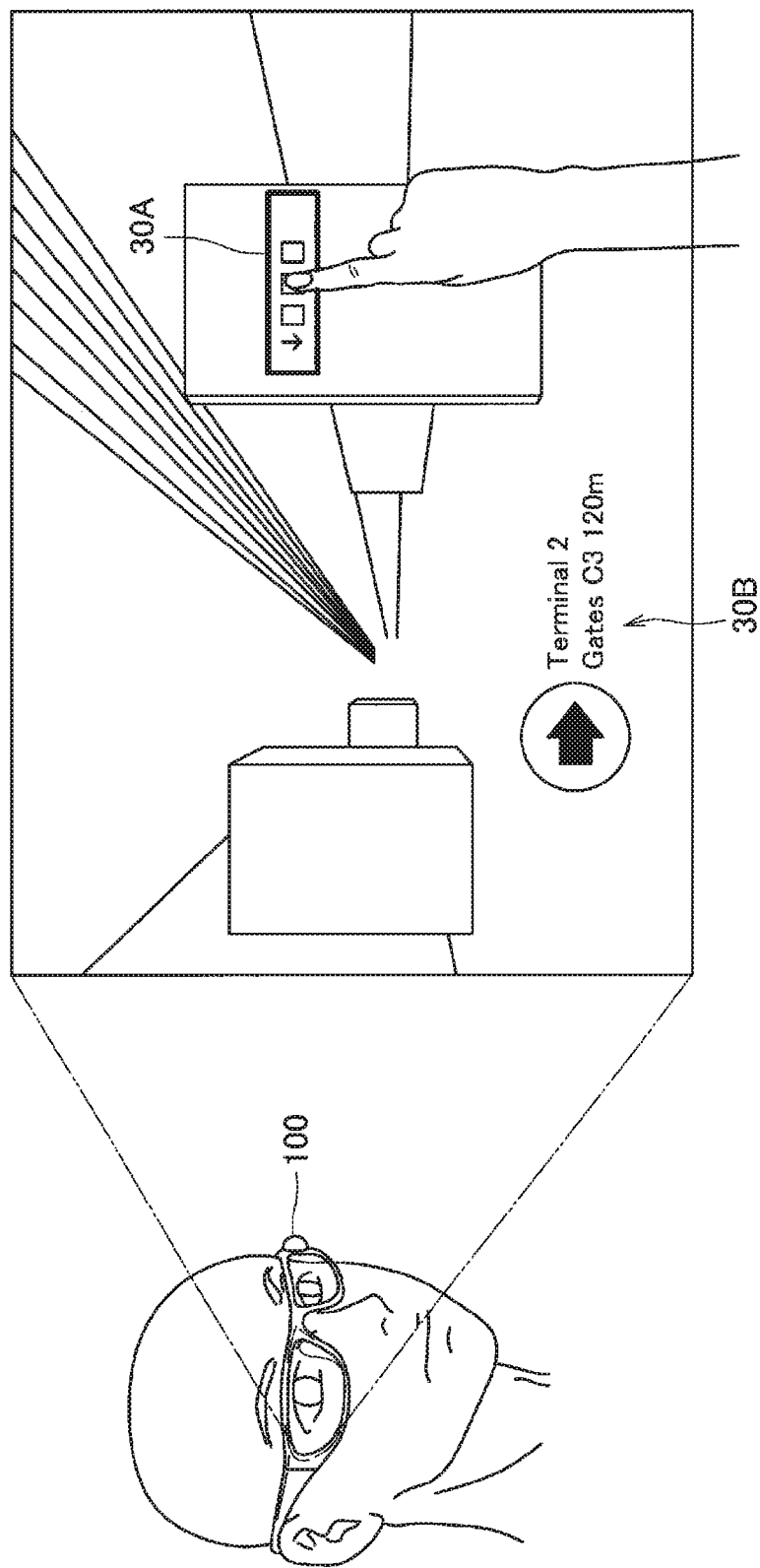
FIG. 13 is a diagram illustrating an example of the information processing device according to the embodiment being applied to a wearable device.

The information processing device 100 may cooperate with a wearable device. Specifically, the information processing device 100 is incorporated into or mounted to a wearable device and provides the wearable device with a result of the recognition processing. The wearable device then performs processing such as outputting an image on the basis of the result of the recognition processing. FIG. 13 is a diagram illustrating an example of the information processing device 100 according to the present embodiment being applied to a wearable device. For example, as illustrated in FIG. 13, the information processing device 100 is mounted to an eyeglass-type wearable device so that the visual field direction of a wearer of the wearable device corresponds to its imaging area. The information processing device 100 performs the recognition processing for an object such as a hand and a signboard appearing in the image acquired by the imaging of the visual field direction. The wearable device then controls to display an object 30A in a superimposed manner on a signboard pointed by a finger of the hand that is recognized by the recognition processing. Furthermore, information relating to the pointed signboard is also displayed as an object 30B in a superimposed manner. With such a configuration, the sensing and the recognition processing are performed more precisely or at a higher speed in the information processing device 100 in place of the wearable device, the value of the function provided by the wearable device can be improved. For example, the interaction with the user is facilitated, whereby the improvement of operability and convenience is enabled.

6-4. Application to Sport

Figure 14:
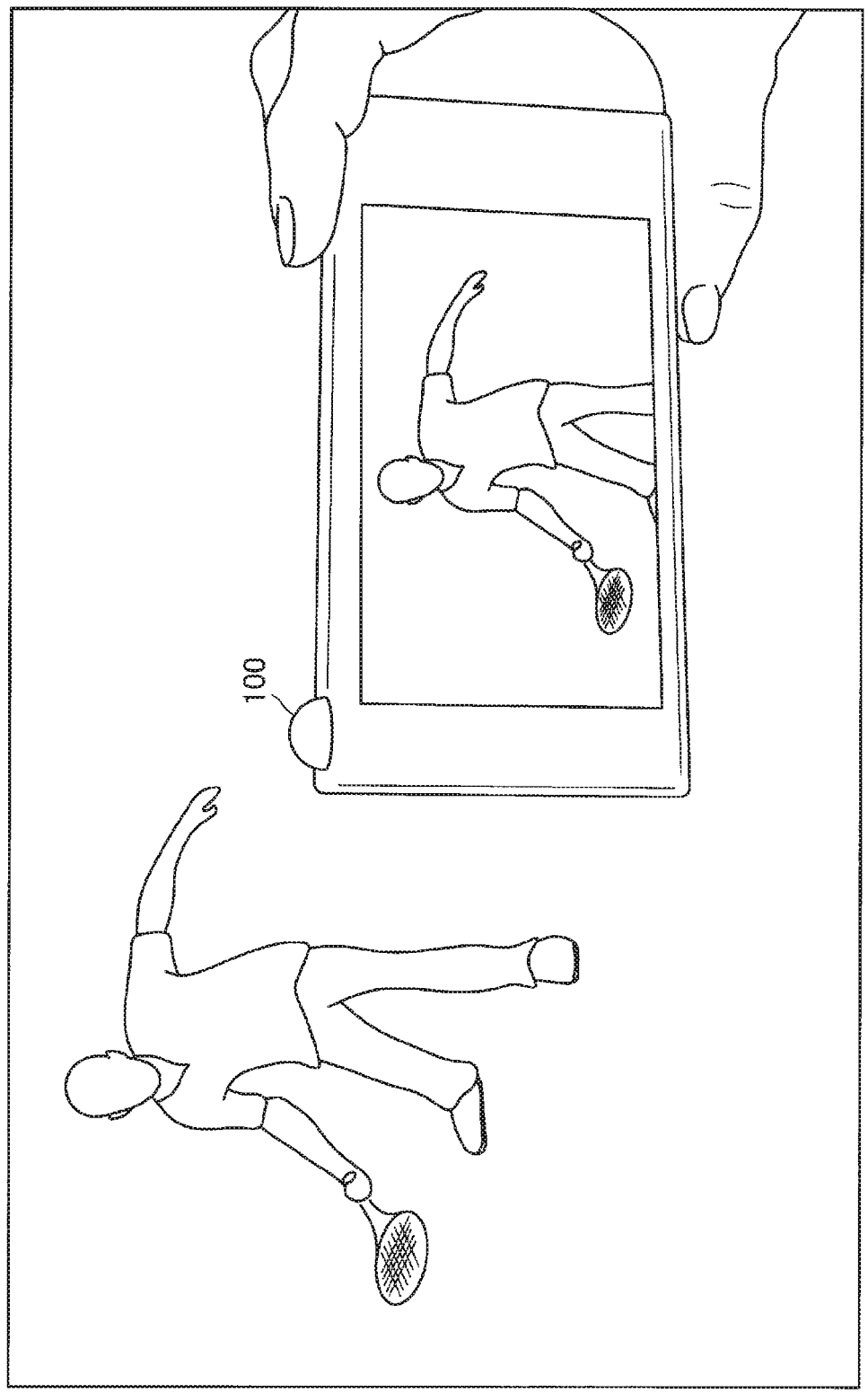
FIG. 14 is a diagram illustrating an example of the information processing device according to the embodiment being applied to a sport.

The information processing device 100 may be used in the field of sports. Specifically, the information processing device 100 is incorporated into or mounted to a device that analyzes the behavior of a person who plays a sport, and provides the device with a result of the recognition processing. The device then analyzes the behavior of a person on the basis of the result of the recognition processing and outputs an analysis result. FIG. 14 is a diagram illustrating an example of the information processing device 100 according to the present embodiment being applied to a sport. For example, as illustrated in FIG. 14, the information processing device 100 is detachably mounted to a mobile terminal such as smartphone. The information processing device 100 performs the recognition processing for a posture or a motion of a person appearing in an image acquired by imaging. The mobile terminal then displays information such as numerical information and advice that is related to the posture or the motion of the person who is recognized in the recognition processing. In addition, a device to which the information processing device 100 is mounted may be a stationary terminal. With such a configuration, the information processing device 100 that enables recognition processing at high speed for sports, which involve quicker motions than those of the everyday life, is applied, whereby more precise information for the motion or the posture of the person who plays a sport can be provided. Accordingly, it is possible to improve the skill of the sport efficiently.

6-5. Application to Vehicle

Figure 15:
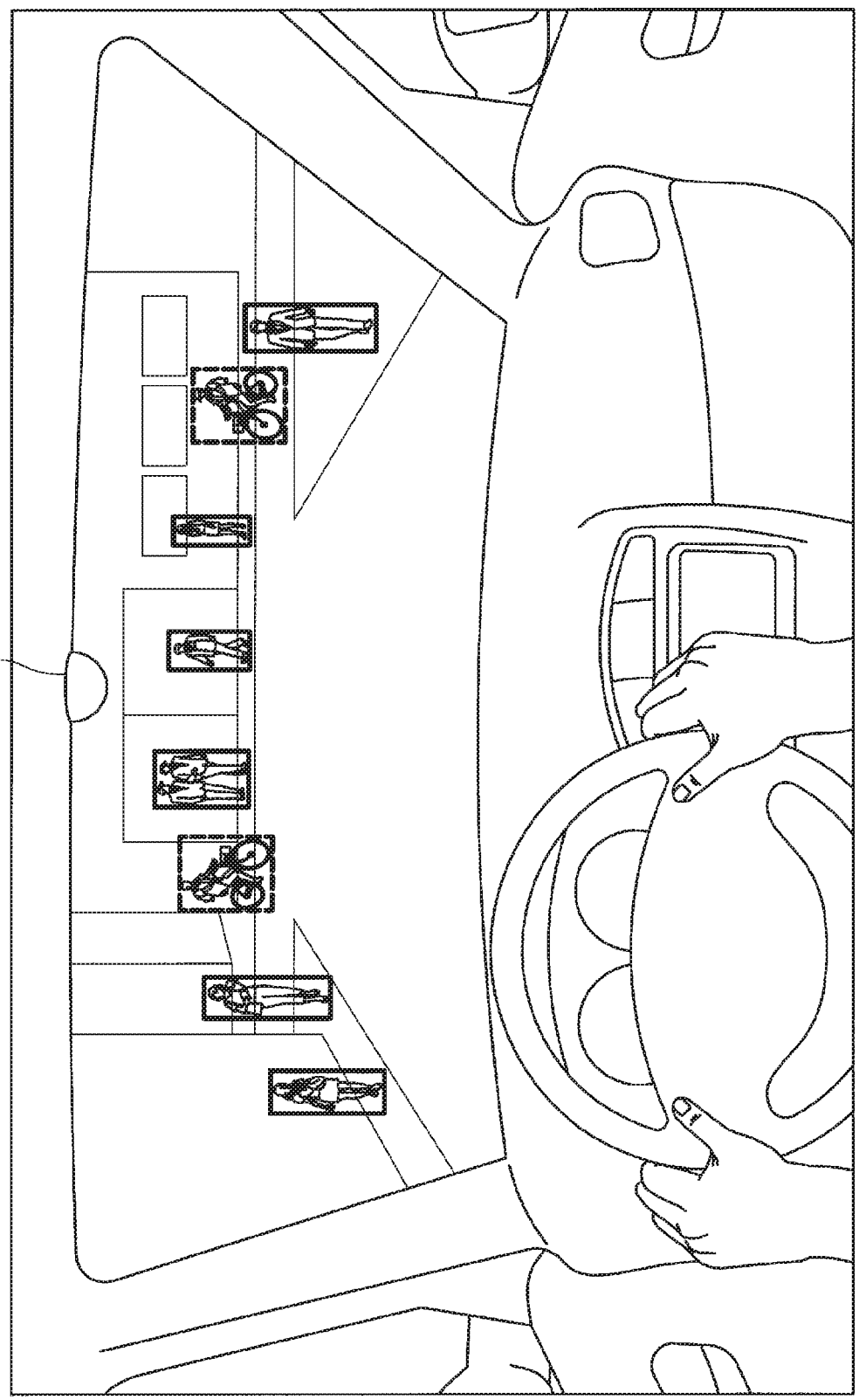
FIG. 15 is a diagram illustrating an example of the information processing device according to the embodiment being applied to a vehicle.

The information processing device 100 may be used in the field of vehicles. Specifically, the information processing device 100 is incorporated into or mounted to the inside or the outside of a vehicle, and provides a control module mounted to the vehicle with a result of the recognition processing. The control module then controls the behavior of the vehicle on the basis of the result of the recognition processing or notifies the user. FIG. 15 is a diagram illustrating an example of the information processing device 100 according to the present embodiment being applied to a vehicle. For example, as illustrated in FIG. 15, the information processing device 100 is attached to the top of the windshield in the vehicle. The information processing device 100 images the outside of the vehicle and performs the recognition processing for persons appearing in the image acquired by the imaging. The control module of the vehicle then causes a projection device, etc. to display objects that follow the persons who are recognized in the recognition processing on the windshield in a superimposed manner. The control module may control vehicle travelling so as to keep a predetermined distance from the recognized persons. Furthermore, the information processing device 100 images the inside of the vehicle and performs the recognition processing for a line of sight of the driver appearing in the image acquired by the imaging. The control module of the vehicle then emits a warning to the driver using a speaker, and the like if the line of sight of the driver recognized in the recognition processing is not directed to the travelling direction. With such a configuration, the information processing device 100 that enables the recognition processing at high speed is used for detecting persons or objects inside and outside of the vehicle, whereby the time needed for the control module performing control processing of the vehicle corresponding to the detection result or notification processing to the driver can be secured sufficiently. Accordingly, restraining the occurrence of an accident is enabled, leading to the improvement of the traffic safety.

7. CONCLUSION

As described above, according to one embodiment of the present disclosure, the contents of the recognition processing are enabled to be controlled according to the association of the identification information with the learning information. Therefore, the association enables excess and deficiency of the provided recognition processing to be suppressed. Accordingly, the suppression of the deficiency of the provided recognition processing enables the suppression of the reduction of the degree of the user satisfaction, and the suppression of the excess of the provided recognition processing enables the reduction in cost of use or the acceleration of processing. Consequently, increasing the number of users using the recognition processing is enabled.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although the recognition processing is performed by hardware such as the processing circuit in the abovementioned embodiment, the present technology is not limited to such examples. For example, a portion or an entirety of the recognition processing may be performed by software.

Furthermore, although the examples in which the recognition processing for objects is performed are principally provided in the abovementioned embodiment, the target of the recognition processing is not limited thereto. For example, examples of the recognition target may include sound, tactile sensation vibration, smell, and the like.

Furthermore, although the example in which the recognition processing is performed by using the learning information that is specified from user identification information provided from the external device such as the output device 200 is provided in the abovementioned embodiment, the user identification information may be generated from sensor information in its own device. For example, the information processing device 100 may recognize the user appearing in the image acquired by the imaging and perform the recognition processing for another object, or the like by using the learning information corresponding to the recognized user.

Further, the effects described in this specification are merely illustrative or exemplified effects, and are not limitative. That is, with or in the place of the above effects, the technology according to the present disclosure may achieve other effects that are clear to those skilled in the art from the description of this specification.

Furthermore, the steps illustrated in the flow charts of the abovementioned embodiment include not only the processing executed in time series according to the described order, but also the processing executed in parallel or individually, although not necessarily executed in time series. In addition, it goes without saying that the order of the steps processed in time series may be changed appropriately.

Furthermore, a computer program that allows hardware embedded in the information processing device 100 to exert a function equivalent to each logical configuration of the abovementioned information processing device 100 can be created. Furthermore, a storage medium in which the computer program is stored is also provided.

Additionally, the present technology may also be configured as below.

(1)

An information processing device including:

a storage unit that stores learning information acquired by machine learning;

an input unit that acquires identification information; and a processing unit that performs recognition processing using the learning information that is specified by the storage unit on a basis of the identification information.

(2)

The information processing device according to (1), in which the recognition processing includes recognition processing in accordance with a neural network, and the learning information includes coefficient information of the neural network.

(3)

The information processing device according to (2), in which the neural network includes a neural network with a multi-layer structure.

(4)

The information processing device according to any one of (1) to (3), in which the identification information includes information for identifying a providing destination of a result of the recognition processing.

(5)

The information processing device according to (4), in which the providing destination includes an application or a device that is operated by a user or on a basis of the result of the recognition processing.

(6)

The information processing device according to any one of (1) to (5), in which the identification information includes information for identifying a recognition target.

(7)

The information processing device according to any one of (4) to (6), in which the identification information is notified from the providing destination of the result of the recognition processing.

(8)

The information processing device according to any one of (1) to (7), in which the identification information includes information for identifying a location or a time slot related to a recognition target in the recognition processing.

(9)

The information processing device according to (8), in which the information for identifying the location or the time slot is generated on a basis of sensor information.

(10)

The information processing device according to any one of (1) to (9), in which the learning information is stored in a storage area that is specified from the identification information.

(11)

The information processing device according to any one of (1) to (10), in which the input unit further acquires the learning information, and the storage unit additionally stores the learning information acquired by the input unit.

(12)

The information processing device according to any one of (1) to (11), in which the storage unit changes the learning information that has been stored.

(13)

The information processing device according to (12), in which the learning information that is changed is generated on a basis of transfer from the learning information that has been stored.

(14)

The information processing device according to any one of (1) to (13), in which a plurality of pieces of the learning information are specified from the identification information, and the processing unit performs the recognition processing using the plurality of pieces of the learning information.

(15)

The information processing device according to any one of (1) to (14), in which a recognition target in the recognition processing includes a presence or absence of an object or a state of the object.

(16)

The information processing device according to any one of (1) to (15), further including:

a sensor that generates sensor information, in which the processing unit performs the recognition processing for the sensor information.

(17)

The information processing device according to (16), in which the processing unit performs the recognition processing for the sensor information that is specified on a basis of information related to the sensor of another information processing device.

(18)

The information processing device according to any one of (1) to (17), in which information for a user that is generated on a basis of the learning information stored in the storage unit is output.

(19)

An information processing method to be executed by a processor, the information processing method including:

storing learning information acquired by machine learning;

acquiring identification information; and performing recognition processing using the learning information that is specified from storage on a basis of the identification information.

(20)

A program causing a computer to achieve:

a storing function for storing learning information acquired by machine learning;

an input function for acquiring identification information; and a processing function for performing recognition processing using the learning information that is specified from storage on a basis of the identification information.

(21)

An information processing system including:

a storage unit that stores learning information acquired by machine learning;

an input unit that acquires identification information; and a processing unit that performs recognition processing using the learning information that is specified by the storage unit on a basis of the identification information.

REFERENCE SIGNS LIST 100 information processing device
102 processor
104 memory
106 bridge
108 bus
110 interface
112 sensor module
114 input module
116 output module
118 connection port
120 communication module
130 imaging unit
140 communication unit
150 processing unit
160 storage unit
200 output device

The invention claimed is:

1. A first information processing device, comprising:
a storage device configured to store first learning information acquired by machine learning; and
at least one processor configured to:
acquire identification information from an output device;
control the storage device to store the first learning information based on the identification information;
receive second learning information from the output device;
control the storage device to store the received second learning information, wherein
the received second learning information is stored in the storage device based on deletion of third learning information from the storage device, when a free space in the storage device is unavailable, and
the third learning information is stored in the storage device based on a user instruction;
execute a recognition processing operation of a recognition target based on one of the stored first learning information or the stored second learning information;
transmit a result of the recognition processing operation to the output device;
receive, based on the transmitted result of the recognition processing operation, a change request from the output device; and
change one of the stored first learning information or the stored second learning information, based on the received change request.

2. The first information processing device according to claim 1, wherein
the at least one processor is further configured to execute the recognition processing operation based on a neural network, and
the first learning information and the second learning information include coefficient information of the neural network.

3. The first information processing device according to claim 2, wherein the neural network includes a multi-layer structure.

4. The first information processing device according to claim 1, wherein the identification information includes information for identification of a providing destination of the result of the recognition processing operation.

5. The first information processing device according to claim 4, wherein
the providing destination includes one of an application or a device, and
each of the device and the application is operated based on one of a user operation or the result of the recognition processing operation.

6. The first information processing device according to claim 1, wherein the identification information includes information for identification of the recognition target.

7. The first information processing device according to claim 1, wherein the identification information includes information for identification of one of a location associated with the recognition target or a time slot associated with the recognition target.

8. The first information processing device according to claim 7, wherein the information for the identification of one of the location or the time slot is generated based on sensor information.

9. The first information processing device according to claim 1, wherein
the first learning information is stored in a storage area of the storage device, and
the storage area is specified based on the identification information.

10. The first information processing device according to claim 1, wherein the at least one processor is further configured to generate the changed first learning information based on a transfer from the stored first learning information.

11. The first information processing device according to claim 1, wherein
a storage area, in the storage device, for each of a plurality of pieces of the first learning information is specified based on the identification information, and
the at least one processor is further configured to execute the recognition processing operation based on the plurality of pieces of the first learning information.

12. The first information processing device according to claim 1, wherein the recognition target in the recognition processing operation includes one of a presence of an object, an absence of the object, or a state of the object.

13. The first information processing device according to claim 1, further comprising a first sensor configured to generate sensor information, wherein the at least one processor is further configured to execute the recognition processing operation based on the sensor information.

14. The first information processing device according to claim 13, wherein
the first sensor is further configured to generate the sensor information based on specific information associated with a second sensor of a second information processing device, and
the second information processing device is different from the first information processing device.

15. The first information processing device according to claim 1, wherein the at least one processor is further configured to:

generate specific information based on the stored first learning information, and output the generated specific information to a user.

16. An information processing method, comprising:

storing, in a storage device, first learning information acquired by machine learning;

acquiring identification information from an output device;

controlling the storage device to store the first learning information based on the identification information;

receiving second learning information from the output device;

controlling the storage device to store the received second learning information, wherein the received second learning information is stored in the storage device based on deletion of third learning information from the storage device, when a free space in the storage device is unavailable, and the third learning information is stored in the storage device based on a user instruction;

executing a recognition processing operation of a recognition target based on one of the stored first learning information or the stored second learning information;

transmitting a result of the recognition processing operation to the output device;

receiving, based on the transmitted result of the recognition processing operation, a change request from the output device; and changing one of the stored first learning information or the stored second learning information, based on the received change request.

17. A non-transitory computer-readable medium having stored thereon computer-executable instructions, which when executed by a computer, cause the computer to execute operations, the operations comprising:

storing, in a storage device, first learning information acquired by machine learning;

acquiring identification information from an output device;

controlling the storage device to store the first learning information based on the identification information;

receiving second learning information from the output device;

controlling the storage device to store the received second learning information, wherein the received second learning information is stored in the storage device based on deletion of third learning information from the storage device, when a free space in the storage device is unavailable, and the third learning information is stored in the storage device based on a user instruction;

executing a recognition processing operation of a recognition target based on one of the stored first learning information or the stored second learning information;

transmitting a result of the recognition processing operation to the output device;

receiving, based on the transmitted result of the recognition processing operation, a change request from the output device; and changing one of the stored first learning information or the stored second learning information, based on the received change request.

* * * * *